United States Patent [19]

Chaneac

[11] Patent Number: 4,848,282

[45] Date of Patent: Jul. 18, 1989

[54] COMBUSTION ENGINE HAVING NO CONNECTING RODS OR CRANKSHAFT, OF THE RADIAL CYLINDER TYPE

[75] Inventor: André Chaneac, Aubenas, France

[73] Assignee: Ateliers De Constructions Et D'Innovations, France

[21] Appl. No.: 126,268

[22] Filed: Nov. 30, 1987

[30] Foreign Application Priority Data

Nov. 28, 1986 [FR] France ................................ 86 16862

[51] Int. Cl.[4] ................................ F16H 21/02

[52] U.S. Cl. ................................ 123/58 AM

[58] Field of Search ................ 123/56 C, 55 R, 55 A, 123/58 A, 58 AM, 197 R, 58 AA, 58 AB

[56] References Cited

U.S. PATENT DOCUMENTS

| | | | |
|---|---|---|---|
| 1,830,046 | 11/1931 | White . | |
| 1,904,680 | 4/1933 | Ferry | 123/56 C |
| 3,735,741 | 5/1973 | Hatz | 123/56 C |
| 4,465,042 | 8/1984 | Bristol | 123/58 A |
| 4,545,336 | 10/1985 | Waide | 123/56 C |
| 4,697,552 | 10/1987 | Kolev | 123/56 C |

FOREIGN PATENT DOCUMENTS

| | | | |
|---|---|---|---|
| 775736 | 1/1935 | France . | |
| 1375892 | 9/1964 | France | 123/56 C |

*Primary Examiner*—David A. Okonsky
*Attorney, Agent, or Firm*—Wall and Roehrig

[57] ABSTRACT

Combustion engine having no connecting rods or crankshaft, whose cylinders are disposed radially. In this engine, the axes of the cylinders are situated in a plane perpendicular to the drive shaft, the alternating movement of the pistons being transmitted by rollers fixed to the said pistons, which rollers roll on a cam fixed to the engine. The movement of the pistons is transmitted via at least three cams, a central cam rotating in one direction and two lateral cams rotating at the same speed but in the opposite direction, the three cams being positioned in a manner such that the apexes of the bosses which they possess are situated in the plane of the axis of the drive shaft at top dead center.

7 Claims, 3 Drawing Sheets

COMBUSTION ENGINE HAVING NO CONNECTING RODS OR CRANKSHAFT, OF THE RADIAL CYLINDER TYPE

The present invention relates to a combustion engine operating in accordance with the spark-ignition principle which possesses no crankshaft or connecting rods, but cams and rollers whose cylinders are disposed in a plane perpendicular to the drive shaft, called a radial engine.

Patents are known for engines wherein the movement of the pistons is transmitted to the drive shaft by cams and rollers. The following patents may be quoted by way of example:

Nov. 3, 1931 Frank WHITE No. 1,830,046 (American)

Jul. 11, 1934 M. L'Hermite No. 775,736 (France).

This form of power transmission has not succeeded because the angle of the tangent to the cam with the axis of the piston rod is too great, resulting in poor efficiency and excessive pressure exerted by the piston on the walls of the cylinder.

The object of the present invention is to provide a solution to the disadvantages mentioned above.

The invention therefore relates to an internal combustion engine which may be of the 2-stroke or 4-stroke cycle, whose cylinders are arranged radially and whose combustion thrust is transmitted to a cam by the piston fixed to a roller rolling on this cam. This cam may possess one, two, three, four . . . (etc.) bosses. Each piston performing a stroke and return at each boss, the drive shaft will therefore rotate in accordance with the number of strokes and returns of each piston divided by the number of bosses.

According to a feature of the invention, the drive shaft bears at least three cams, a central cam rotating in one direction and two lateral cams rotating at the same speed but in the opposite direction.

According to another feature of the invention, the inversion of the central cam and of the two lateral cams takes place by virtue of two planetary gear trains called Pecqueur trains.

According to another feature of the invention the two lateral cams each possess, in addition to the profile of each cam, a groove on the outer wall of the cam, intended to bring back the rollers and the pistons to bottom dead center at the moment of starting.

According to another feature of the invention, it will be possible to obtain, on each side of a single line of cylinders, two drive shafts which are concentric but rotate in opposite directions.

According to another feature of the invention it will be possible to obtain the means for producing a compressor by arranging the combustion piston so that the latter produces on the one hand combustion in its upper part and on the other hand compression in its lower part.

According to another feature of the invention, the design of the cams is arranged so that the tops of the bosses of the three cams bring the piston to top dead center, then lower it slightly, and finally bring it back to top dead center in a manner such as to obtain a variation in the volume of the combustion chamber in order to promote combustion, a combustion stroke of substantially constant volume thus being obtained.

Other technical advantages will be explained in the description of the invention, in which.

Figure 1:
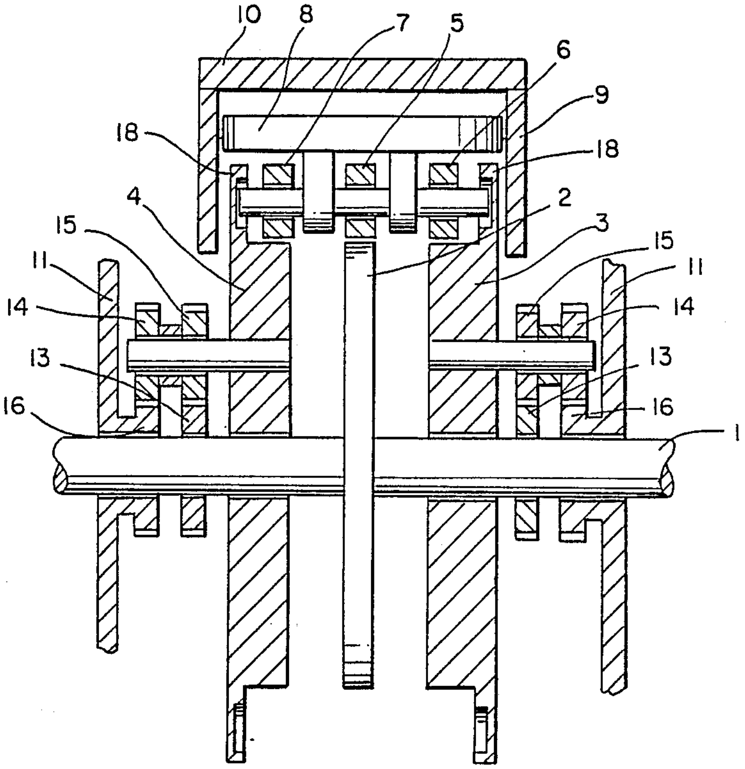
FIG. 1 is a view in transverse section of a cylinder possessing a central cam and two lateral cams with their lateral grooves.

FIG. 1 shows a view in section of an engine where a single cylinder has been shown. We find the drive shaft 1 fixed to the central cam 2, with the two lateral cams 3, 4. On these three cams rest the rollers 5, 6, 7 fixed to the piston 8 which moves in the cylinder 9 terminating in the cylinder head 10. The engine block 11 bears the drive shaft 1. The two lateral cams 3 and 4 rotate in the opposite direction to the central cam 2 by virtue of a train of planetary gears called a Pecqueur train, and the drive shaft 1 drives the central gears 13 which drive the planet pinions 15 and 14 fixed to the cams 3 and 4. These planet pinions, bearing on the gears 16 fixed to the crankcase 11, cause the cams 3 and 4 to rotate in the opposite direction to the cam 2 fixed to the drive shaft 1, and at equal speed thereto; depending on the choice of the number of teeth of the pinions 13, 14, 15 and 16 the cams 3 and 4 bear a plurality of planet pinions 14 and 15. A groove 18 is formed on the external extension of the cams 3 and 4 in order to bring the pistons 8 back to bottom dead center when the engine is started. Mini-bosses 19 (not shown) on the cams 3 and 4 make it possible to control the engine valve lift. In the case of an even number of cylinders and an odd number of bosses on the cams, it will be possible to eliminate this groove 18 and replace it with cables linking the opposed pistons 8. The profile of the central cam is symmetrical with the profile of the lateral cams in order to be able to rotate while retaining the piston rollers.

Figure 2:
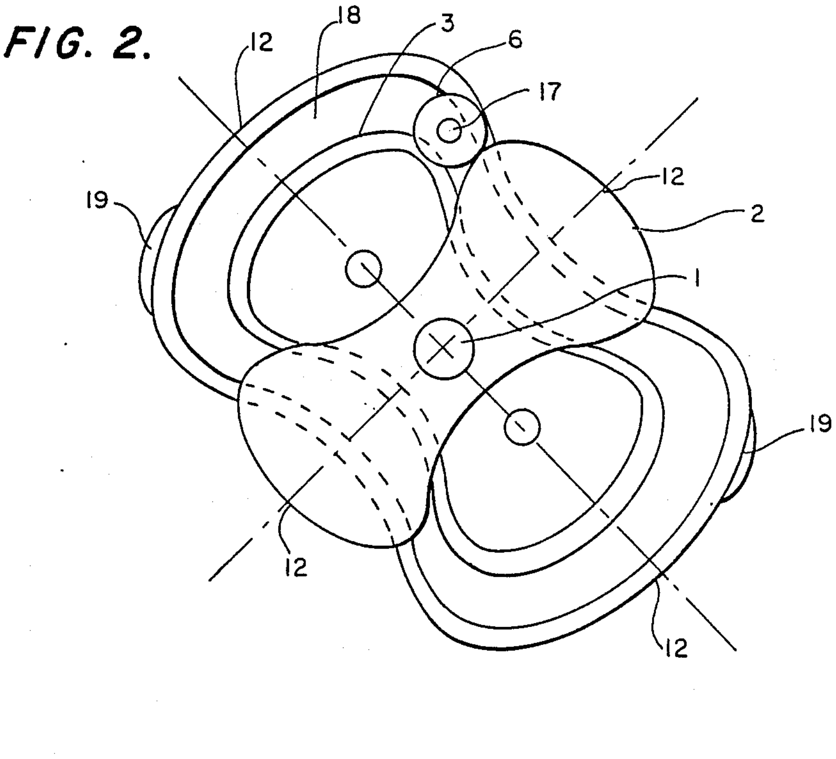
FIG. 2 is a front view in section showing a lateral cam and a central cam.

FIG. 2 is a front view in section showing a central cam and a lateral cam possessing two bosses 12. The drive shaft 1, the central cam 2 and a lateral cam 3 are again present, a roller 6 fixed to the piston by its spindle 17 bearing on a groove 18 on the external extension of the cam 3. The mini-bosses 19 make it possible to lift (as before the engine intake and exhaust valves. The cams 2, 3 and 4 could have been shown with 3, 4, 5 etc., bosses. In this case the drive shaft would rotate 3, 4, 5, etc., times less rapidly than the number of strokes and returns performed by the pistons.

Figure 3:
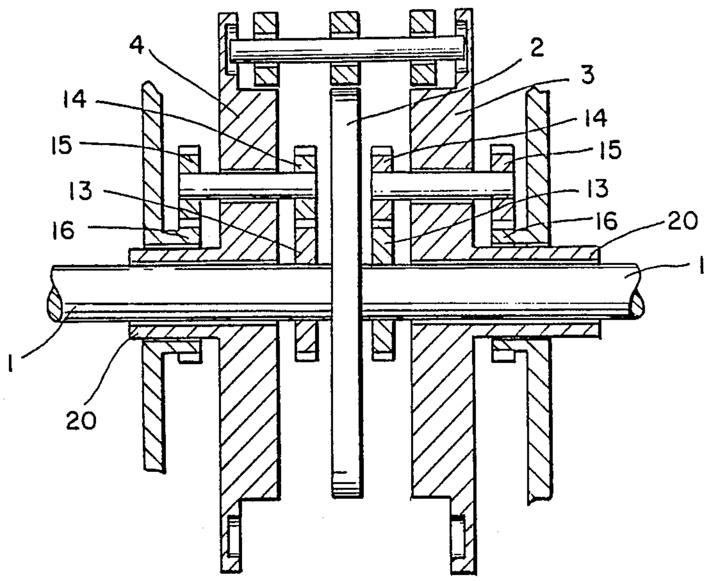
FIG. 3 is a view in transverse section of an engine having a single line of cylinders and two concentric drive shafts rotating in opposite directions.

FIG. 3 is a view in transverse section of an engine having a single line of cylinders and two concentric drive shafts rotating at equal speed but in opposite directions, only the upper part being shown. The various elements are again present: the drive shaft 1 fixed to the central cam 2, the lateral cams 3 and 4 rotating in opposite directions to the central cam 2 and at equal speed thereto by virtue of the pinions 13, 14, 15, 16, but the arrangement of the cam 4 is slightly different, the pinion 13 fixed to the drive shaft 1 being placed between the cams 2 and 4 and attacking the pinion 14 fixed to the pinion 15 located on the other side of the cam 4, which bears on the fixed pinion 16. A second drive shaft 20 which is counter-rotatory to the shaft 1 is obtained.

Figure 4:
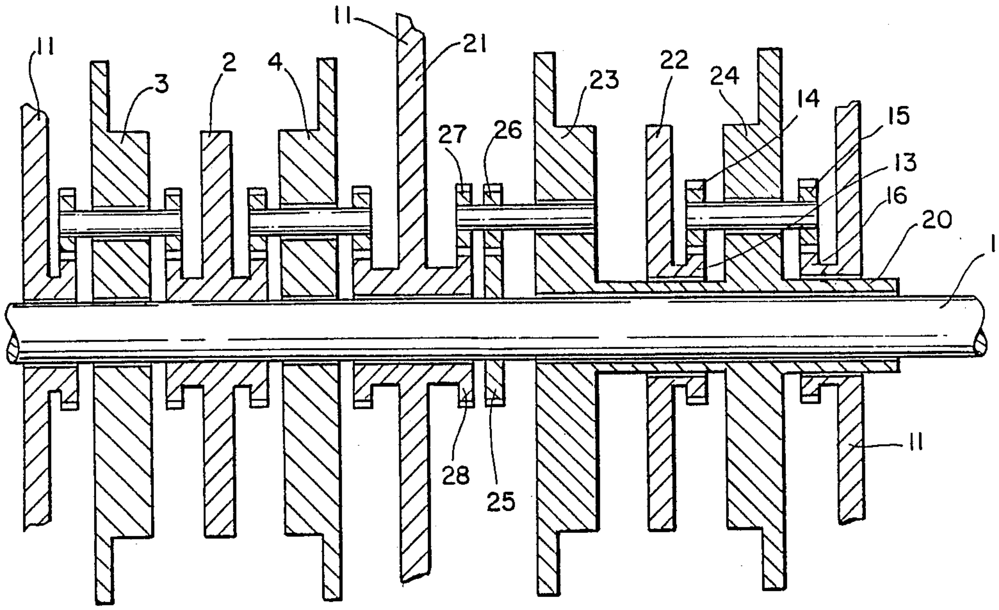
FIG. 4 is a view in transverse section of an engine having two lines of cylinders driving two concentric drive shafts rotating at the same speed but in opposite directions.

FIG. 4 is a view in transverse section of an engine having two lines of cylinders driving two drive shafts, the crankcase 11 being assembled with the crankcase 21 to form a single block. The cams 2, 3, 4 with the planet pinions 13, 14, 15, 16 are again present, and the two drive shafts 1 and 20 are obtained, rotating at the same speed but in opposite directions.

Figure 5:
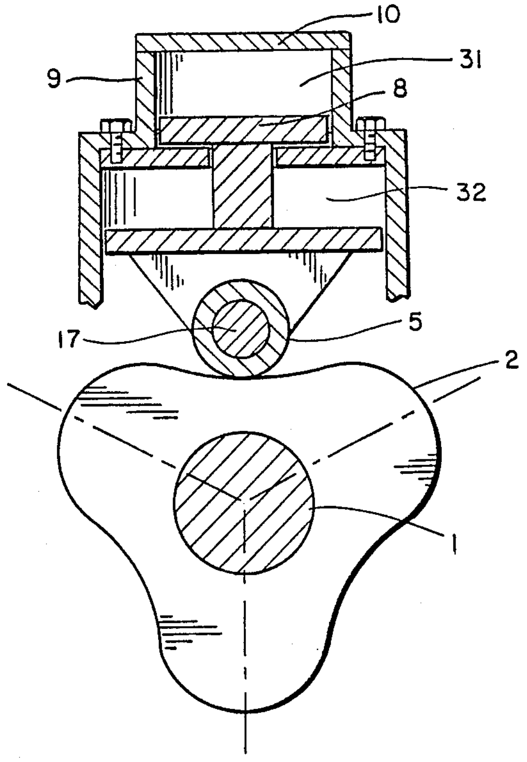
FIG. 5 is a view in transverse section of a cylinder showing the arrangement of a piston in order to obtain an air compressor.

FIG. 5 is a front view in section showing a central cam 2 with its drive shaft 1 and its roller 5 journaled on its spindle 17. This roller is attached to the piston 8 which comprises two parts: in the upper part are comprised the cylinder 9, the cylinder head 10 and the combustion chamber 31; in the lower part, which may be of greater diameter, the bottom of the piston 8 compresses the space 32 to provide a supply of compressed air to the engine, a very simple compressor thus being obtained. Of course, intake and exhaust passages and valves will enable the air thus compressed to return to the cylinder head 10, but this does not form part of the invention and has therefore not been shown.

Figure 6:
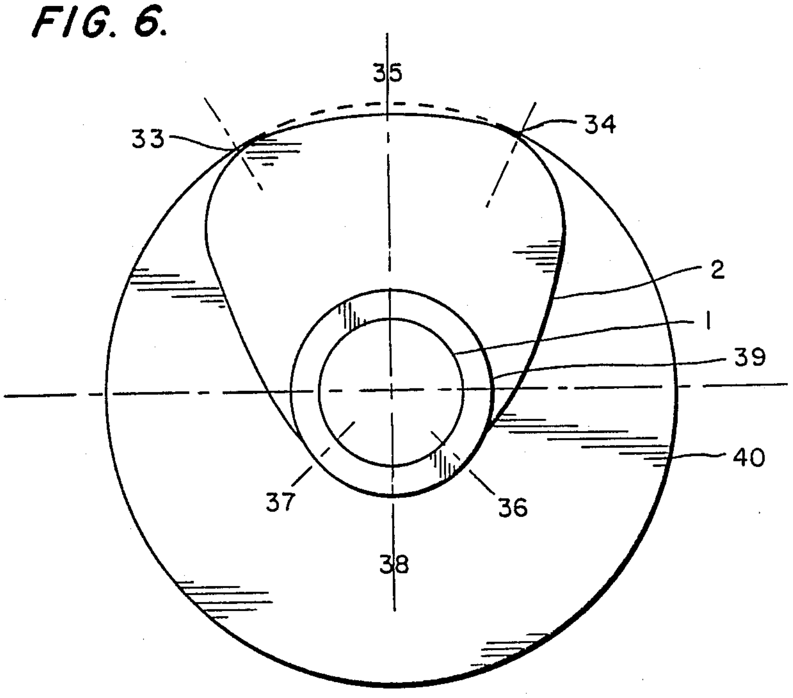
FIG. 6 is a front view showing a cam with a single boss in the case where firing takes place once for each stroke and return of the piston (2-stroke type).

FIG. 6 is a front view showing a cam having a single boss. It is noted that we obtain one working stroke per stroke and return of the piston (two-stroke type engine). We find the drive shaft 1 driving the cam 2; the piston which bears on this cam reaches top dead center at the point 33 then desends back to the point 35 and ascends back to top dead center 34. Between the point 34 and the point 36 the cam receives the thrust of the piston and causes the drive shaft 1 to rotate, which is the expansion. The point 36 is bottom dead center, and the piston therefore remains at bottom dead center until the point 37 which permits the combusted gases to escape and fresh gases to be introduced. From the point 37 the piston begins its compression, which is completed at the pint 33, and the cycle begins again.

It would have been possible to obtain one working stroke for every two strokes and returns of the piston (four-stroke type engine), in which case the points 36 and 37 would be merged at the point 38 and three strokes would be obtained per stroke and return. 33-34 Dead time, 34-38 intake, 38-33 compression, 33-34 Constant volume combustion, 34-38 expansion, 38-3 Exhaust, the two circles 39 and 40 showing the bottom and top dead center of the pistons.

It is noted that a cam having an asymmetrical profile could be designed in order to extend the combustion stroke or the expansion without consequently departing from the scope of the invention.

The center of the cam could also be shifted in order to extend or reduce certain periods of the combustion cycle.

It would also be possible to obtain any number of concentric drive shafts by grouping lines of cylinders, without consequently departing from the scope of the invention.

I claim:

1. In an internal combustion engine having a housing and at least one cylinder radially disposed about an output shaft in a plane perpendicular to the axis of said shaft the combination of:

- a first cam member fixed on said output shaft,
- two other cam members rotatably mounted on said output shaft,
- gear train means rotatably engaging said other cam members and said drive shaft,
- a piston mounted in a cylinder for reciprocal motion therein,
- a plurality of rollers rotatably mounted on said piston,
- said piston and cam members being positioned in said housing so that said rollers rotatably engage said cam members to transmit power from said piston to said output shaft, and
- said cam members further being positioned in a manner such that the apexes of the cam bosses are in the plane of the axis of the drive shaft at top dead center.

2. An internal combustion engine as defined in claim 1 wherein said gear train means comprises a planetary Pecqueur gear train arranged to allow said other cam members to rotate in a direction opposite to the direction of rotation of said first cam member.

3. An internal combustion engine as defined in claim 1 wherein said first cam member and said other cam members all have symmetrical profiles.

4. A device as claimed in claim 1 wherein the apex portions of said cam members are concave whereby the cams bring said piston to top dead center then lower it back slightly and then bring it back to top dead center such as to obtain variation in volume of the combustion chamber.

5. A device as claimed in claim 1 wherein said cylinder comprises a first combustion chamber and a second air compression chamber and said piston has a first combustion portion and a second air compression portion whereby power is transmitted to the output shaft and a source of compressed air is provided.

6. An internal combustion engine as defined in claim 2 wherein said two other cam members are mounted on either side of said first cam member, and each have outwardly extending therefrom cylindrical hub portions forming a pair of rotating shaft members, whereby said piston transmits power to said cams and thence to at least two output shafts rotating in opposite directions.

7. A device as claimed in claim 2 further characterized by a plurality of cylinder lines disposed axially along said output shaft, said cylinder lines being positioned so that one of said lines of cylinders drives said output shaft and another of said lines of cylinders drives a second output shaft in the opposite direction.

* * * * *